(12) United States Patent
Blackmon et al.

(10) Patent No.: US 12,477,684 B1
(45) Date of Patent: Nov. 18, 2025

(54) FLUID CIRCULATION SYSTEMS AND COOLING FACILITIES WITH ELEVATED HEAT EXCHANGER

(71) Applicant: Rhodium Technologies LLC, Rockdale, TX (US)

(72) Inventors: Chase Blackmon, Rockdale, TX (US); William Boardman, Rockdale, TX (US)

(73) Assignee: Rhodium Technologies LLC, Rockdale, TX (US)

( * ) Notice: Subject to any disclaimer, the term of this patent is extended or adjusted under 35 U.S.C. 154(b) by 305 days.

(21) Appl. No.: 18/179,061

(22) Filed: Mar. 6, 2023

Related U.S. Application Data

(60) Provisional application No. 63/317,525, filed on Mar. 7, 2022.

(51) Int. Cl.
*H05K 7/20* (2006.01)
*G06F 1/20* (2006.01)

(52) U.S. Cl.
CPC .......... *H05K 7/20263* (2013.01); *G06F 1/20* (2013.01); *H05K 7/20172* (2013.01); *H05K 7/20236* (2013.01); *H05K 7/20272* (2013.01)

(58) Field of Classification Search
CPC .......... H05K 7/20263; H05K 7/20172; H05K 7/20236; H05K 7/20272; H05K 7/203; G06F 1/20
See application file for complete search history.

(56) References Cited

U.S. PATENT DOCUMENTS

| 3,406,244 | A | | 10/1968 | Oktay | |
|---|---|---|---|---|---|
| 3,855,480 | A | * | 12/1974 | Striker | G01F 15/024 307/118 |

(Continued)

FOREIGN PATENT DOCUMENTS

| CN | 107885947 B | * | 12/2020 | ............. E02D 31/08 |
|---|---|---|---|---|
| JP | H04116758 U | | 10/1992 | |

(Continued)

OTHER PUBLICATIONS

Shuo Li, Ali Moradi, Brad Vickers, M.R. Flynn "Cooling tower plume abatement using a coaxial plume structure", Dec. 14, 2017, ScienceDirect, p. 3 (https://www.sciencedirect.com/science/article/pii/S0017931017346938). (Year: 2017).*

(Continued)

*Primary Examiner* — Stephen S Sul
(74) *Attorney, Agent, or Firm* — McDonnell Boehnen Hulbert & Berghoff LLP

(57) ABSTRACT

A fluid circulation system for cooling a plurality of computing devices with a dielectric includes a plurality of fluid tanks, an air cooled heat exchanger, a fan and a pump. Each fluid tank includes a bottom having a plurality of apertures for receiving the dielectric fluid. Each fluid tank is configured to hold a group of computing devices over the plurality of apertures. The air-cooled heat exchanger is elevated at least fifteen feet over a support surface. The air-cooled heat exchanger is in fluid communication with the plurality of fluid tanks and is configured to receive the dielectric fluid. The fan is configured to circulate air through the air-cooled heat exchanger so as to remove thermal energy from the dielectric fluid. The pump is configured to circulate the dielectric fluid through the fluid circulation system.

17 Claims, 8 Drawing Sheets

(56) References Cited

U.S. PATENT DOCUMENTS

| | | | |
|---|---|---|---|
| 4,072,188 A | 2/1978 | Wilson et al. | |
| 4,453,197 A | 6/1984 | Burrage | |
| 4,590,538 A | 5/1986 | Cray | |
| 4,870,243 A | 9/1989 | Wilson et al. | |
| 5,167,511 A | 12/1992 | Krajewski et al. | |
| 5,448,108 A | 9/1995 | Quon et al. | |
| 6,019,167 A | 2/2000 | Bishop et al. | |
| 6,535,382 B2 | 3/2003 | Bishop et al. | |
| 6,555,298 B1 | 4/2003 | Rolfson | |
| 6,776,707 B2 | 8/2004 | Koplin | |
| 7,063,268 B2 * | 6/2006 | Chrysler | F04B 19/24 310/365 |
| 7,200,007 B2 | 4/2007 | Yasui et al. | |
| 7,280,356 B2 | 10/2007 | Pfahnl et al. | |
| 7,318,322 B2 | 1/2008 | Ota et al. | |
| 7,403,392 B2 | 7/2008 | Attlesey et al. | |
| 7,414,845 B2 | 8/2008 | Attlesey et al. | |
| 7,433,188 B2 | 10/2008 | Miller | |
| 7,724,517 B2 | 5/2010 | Attlesey et al. | |
| 7,724,524 B1 | 5/2010 | Campbell et al. | |
| 7,905,106 B2 | 3/2011 | Attlesey | |
| 7,911,782 B2 | 3/2011 | Attlesey et al. | |
| 7,911,793 B2 | 3/2011 | Attlesey | |
| 8,009,419 B2 | 8/2011 | Attlesey | |
| 8,014,150 B2 | 9/2011 | Campbell et al. | |
| 8,035,972 B2 | 10/2011 | Ostwald et al. | |
| 8,089,764 B2 | 1/2012 | Attlesey | |
| 8,089,765 B2 | 1/2012 | Attlesey | |
| 8,089,766 B2 | 1/2012 | Attlesey | |
| 8,305,759 B2 | 11/2012 | Attlesey et al. | |
| 8,369,090 B2 | 2/2013 | Chester et al. | |
| 8,467,189 B2 | 6/2013 | Attlesey | |
| 8,654,529 B2 | 2/2014 | Attlesey | |
| 8,724,322 B2 | 5/2014 | Rinke | |
| 9,025,330 B2 * | 5/2015 | Hodes | H05K 7/20754 361/698 |
| 9,051,502 B2 | 6/2015 | Sedarous et al. | |
| 9,086,859 B2 | 7/2015 | Attlesey | |
| 9,128,681 B2 | 9/2015 | Attlesey | |
| 9,176,547 B2 | 11/2015 | Attlesey | |
| 9,223,360 B2 | 12/2015 | Attlesey | |
| 9,426,927 B2 | 8/2016 | Shafer et al. | |
| 9,451,726 B2 | 9/2016 | Regimbal et al. | |
| 9,504,190 B2 | 11/2016 | Best | |
| 9,756,766 B2 | 9/2017 | Best | |
| 9,801,313 B2 | 10/2017 | Peterson et al. | |
| 9,844,167 B2 | 12/2017 | Peterson et al. | |
| 9,913,402 B2 | 3/2018 | Shafer et al. | |
| 9,918,408 B2 | 3/2018 | Regimbal et al. | |
| 9,921,622 B2 | 3/2018 | Shelnutt et al. | |
| 9,992,914 B2 | 6/2018 | Best et al. | |
| 10,123,453 B2 | 11/2018 | Saito | |
| 10,123,463 B2 | 11/2018 | Best et al. | |
| 10,194,559 B2 | 1/2019 | Saito | |
| 10,219,415 B2 | 2/2019 | Wiley | |
| 10,225,957 B2 | 3/2019 | Gao et al. | |
| 10,257,963 B2 | 4/2019 | Ozyalcin et al. | |
| 10,271,456 B2 | 4/2019 | Tufty et al. | |
| 10,349,555 B2 | 7/2019 | Barragy et al. | |
| 10,349,560 B2 | 7/2019 | Norton et al. | |
| 10,390,458 B2 | 8/2019 | Tufty et al. | |
| 10,405,457 B2 | 9/2019 | Boyd et al. | |
| 10,512,192 B2 | 12/2019 | Miyoshi | |
| 10,609,839 B1 | 3/2020 | Archer et al. | |
| 10,624,242 B2 | 4/2020 | Best | |
| 10,645,841 B1 | 5/2020 | Mao et al. | |
| 10,667,434 B1 * | 5/2020 | Mao | H05K 7/20772 |
| 10,750,637 B1 | 8/2020 | Alissa et al. | |
| 10,820,446 B2 | 10/2020 | Boyd et al. | |
| 10,866,144 B2 | 12/2020 | Nayak et al. | |
| 10,871,807 B2 | 12/2020 | Best et al. | |
| 10,928,867 B2 | 2/2021 | Slaby et al. | |
| 10,939,581 B1 * | 3/2021 | Chen | H05K 7/20781 |
| 2006/0090881 A1 | 5/2006 | Tuma | |
| 2006/0126292 A1 | 6/2006 | Pfahni | |
| 2008/0013276 A1 | 1/2008 | Pyle | |
| 2008/0017355 A1 | 1/2008 | Attlesey et al. | |
| 2008/0192389 A1 | 8/2008 | Muench et al. | |
| 2014/0211412 A1 | 7/2014 | Best | |
| 2015/0083363 A1 * | 3/2015 | Lindenstruth | H05K 7/20781 165/47 |
| 2019/0124790 A1 | 4/2019 | Tufty et al. | |
| 2020/0025451 A1 | 1/2020 | Stone et al. | |
| 2020/0107470 A1 | 4/2020 | Archer et al. | |
| 2021/0153390 A1 | 5/2021 | Tufty et al. | |
| 2021/0185859 A1 * | 6/2021 | Gao | G06F 1/20 |
| 2022/0104394 A1 * | 3/2022 | Boyd | H05K 7/20272 |
| 2022/0361381 A1 * | 11/2022 | Sweeney | H05K 7/20781 |
| 2022/0369504 A1 * | 11/2022 | Clerc | H05K 7/20272 |
| 2023/0225077 A1 * | 7/2023 | Sweeney, II | G06F 1/206 361/679.47 |
| 2025/0008686 A1 * | 1/2025 | De Klein | H05K 7/20272 |
| 2025/0071943 A1 * | 2/2025 | Fang | H05K 7/20818 |

FOREIGN PATENT DOCUMENTS

| | | |
|---|---|---|
| RU | 2500013 | 11/2013 |
| WO | 2010058154 | 5/2010 |
| WO | 2019006437 | 1/2019 |

OTHER PUBLICATIONS

Lin Feng; Zhong Qiheng; Lin Zi'ang, "Method for reducing ground vibration caused by collapse of large-scale structure", 2018 Apr. 2006, Univ Tongji, Entire Document (Translation of CN 107885947). (Year: 2018).*

"Water Viscosity: Dynamic and Kinematic Viscosity at Various Temperatures and Pressures", 2021. (Year: 2021).*

P. E. Tuma, "The merits of open bath immersion cooling of datacom equipment," 2010 26th Annual IEEE Semiconductor Thermal Measurement and Management Symposium (SEMI[1]THERM), 2010, pp. 123-131, doi: 10.1109/STHERM.2010.5444305.

R. C. Chu, R. E. Simons, M. J. Ellsworth, R. R. Schmidt and V. Cozzolino, "Review of cooling technologies for computer products," in IEEE Transactions on Device and Materials Reliability, vol. 4, No. 4, pp. 568-585, Dec. 2004, doi: 10.1109/TDMR.2004.840855.

Liu, C.; Yu, H. Evaluation and Optimization of a Two-Phase Liquid-Immersion Cooling System for Data Centers. Energies 2021, 14, 1395. https://doi.org/10.3390/en14051395.

Midas Green Tech, "Data Center Immersion Cooling" Retrieved from https://www.slideserve.com/gita/data-center-immersion-cooling on Apr. 21, 2022.

Green Revolution Cooling, "Technology", Retrieved from https://web.archive.org/web/20110201123746/http://www.grcooling.com/?page_id=70 on Aug. 10, 2023.

Green Revolution Cooling "CarnotJet" Retrieved from https://web.archive.org/web/20100806071410/http://www.grcooling.com/?page_id=6 on Aug. 10, 2023.

* cited by examiner

FLUID CIRCULATION SYSTEMS AND COOLING FACILITIES WITH ELEVATED HEAT EXCHANGER

CROSS-REFERENCE TO RELATED APPLICATION

The present application claims priority to U.S. Provisional Application No. 63/317,525, filed Mar. 7, 2022, which is hereby incorporated by reference.

BACKGROUND

Computing devices generate heat during operation. Thermal management systems may be used to dissipate heat that is generated by the computing devices.

SUMMARY

Embodiments described herein relate to fluid circulation systems, cooling facilities, and methods for cooling a plurality of computing devices with a dielectric fluid. Example fluid circulation systems described herein include an elevated heat exchanger. Beneficially, embodiments described herein may improve heat transfer performance of the fluid circulation system.

In a first aspect, a fluid circulation system for cooling a plurality of computing devices with a dielectric fluid is disclosed. The fluid circulation system includes a plurality of fluid tanks and an air-cooled heat exchanger. Each fluid tank includes a bottom having a plurality of apertures for receiving the dielectric fluid. Further, each fluid tank is configured to hold a group of computing devices over the plurality of apertures. The air-cooled heat exchanger is elevated at least fifteen feet over a support surface. The air-cooled heat exchanger is in fluid communication with the plurality of fluid tanks and is configured to receive the dielectric fluid. A fan is configured to circulate air through the air-cooled heat exchanger so as to remove thermal energy from the dielectric fluid. Moreover, a pump is configured to circulate the dielectric fluid through the fluid circulation system.

In an embodiment of the fluid circulation system, the air-cooled heat exchanger is positioned higher than each of the plurality of fluid tanks.

In another embodiment of the fluid circulation system, the system further includes a safety valve downstream of the air-cooled heat exchanger and upstream of the plurality of tanks.

In another embodiment of the fluid circulation system, the safety valve is configured to close in response to a shut-off signal associated with a flow of dielectric through the pump.

In another embodiment of the fluid circulation system, the air-cooled heat exchanger includes a plurality of enclosed conduits configured to receive the dielectric fluid, and air passages between the enclosed conduits.

In another embodiment of the fluid circulation system, at least a portion of the enclosed conduits of the air-cooled heat exchanger have a cross-sectional area of no more than 1 sq inch.

In another embodiment of the fluid circulation system, each fluid tank is an open tank.

In another embodiment of the fluid circulation system, the fluid circulation system further includes a collector including a first cavity, a second cavity, and a perforated plate between the first and second cavities.

In another embodiment of the fluid circulation system, the collector is downstream of the plurality of fluid tanks and upstream of the pump, and wherein the pump is upstream of the air-cooled heat exchanger.

In another embodiment of the fluid circulation system, the fluid circulation system further includes the dielectric fluid disposed in the fluid tank, the air-cooled heat exchanger, and the pump.

In another embodiment of the fluid circulation system, the dielectric fluid has a kinematic viscosity at 45° C. of no more than 20 cSt.

In another embodiment of the fluid circulation system, the plurality of fluid tanks includes a first fluid tank disposed over a second fluid tank in a column.

In another aspect, a cooling facility is disclosed. The cooling facility includes a building comprising walls and a roof that defines a building footprint. A plurality of fluid tanks are disposed inside the building. Each fluid tank comprising a bottom having a plurality of apertures for receiving the dielectric fluid. Further, each fluid tank is configured to hold a group of computing devices over the plurality of apertures. An air-cooled heat exchanger is disposed outside the building footprint and elevated at least fifteen feet over a support surface. The air-cooled heat exchanger is in fluid communication with the plurality of fluid tanks and is configured to receive the dielectric fluid. A fan disposed is outside the building footprint and is configured to circulate air through the air-cooled heat exchanger so as to remove thermal energy from the dielectric fluid. A pump is configured to circulate the dielectric fluid through the plurality of fluid tanks and the air-cooled heat exchanger.

In an embodiment of the cooling facility, the air-cooled heat exchanger is positioned higher than each of the plurality of fluid tanks.

In another embodiment of the cooling facility, the fan is disposed above the air-cooled heat exchanger.

In another embodiment of the cooling facility, the fan is surrounded by a shroud, and an outlet of the shroud is positioned higher than the roof of the building.

In another embodiment of the cooling facility, each fluid tank is an open tank.

In another embodiment of the cooling facility, the plurality of fluid tanks, the air-cooled heat exchanger, and the pump are part of a fluid circulation system, where the fluid circulation system includes a portion that is inside the building and a portion that is outside the building. The portion of the fluid circulation system that is outside the building is sealed.

In another embodiment of the cooling facility, the plurality of fluid tanks includes a first fluid tank disposed over a second fluid tank in a column.

In another embodiment of the cooling facility, the system further includes a secondary heat exchanger disposed adjacent to the air-cooled heat exchanger and configured to cool air that enters the air-cooled heat exchanger.

These as well as other aspects, advantages, and alternatives will become apparent to those of ordinary skill in the art by reading the following detailed description with reference where appropriate to the accompanying drawings.

BRIEF DESCRIPTION OF THE DRAWINGS

The accompanying drawings are included to provide a further understanding of the systems, facilities, methods, and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The following detailed description describes various features and functions of the disclosed apparatus, system, and methods with reference to the accompanying figures. The illustrative apparatus, system, and method embodiments described herein are not meant to be limiting. It will be readily understood that certain aspects of the disclosed apparatus, system, and methods can be arranged and combined in a wide variety of different configurations, all of which are contemplated herein.

I. Introduction

An example fluid circulation system for cooling a plurality of computing devices with a dielectric includes a plurality of fluid tanks, an air cooled heat exchanger, a fan, and a pump. Each fluid tank includes a bottom having a plurality of apertures for receiving the dielectric fluid. Each fluid tank is configured to hold a group of computing devices over the plurality of apertures. The air-cooled heat exchanger is elevated at least fifteen feet over a support surface. The air-cooled heat exchanger is in fluid communication with the plurality of fluid tanks and is configured to receive the dielectric fluid. The fan is configured to circulate air through the air-cooled heat exchanger so as to remove thermal energy from the dielectric fluid. The pump is configured to circulate the dielectric fluid through the fluid circulation system. Beneficially, elevating the air-cooled heat exchanger may reduce the likelihood of recirculating cooling air through the heat exchanger, thereby improving the heat transfer performance of the fluid circulation system.

An example cooling facility includes a building comprising walls and a roof that defines a building footprint. A plurality of fluid tanks are disposed inside the building. Each fluid tank comprises a bottom having a plurality of apertures for receiving the dielectric fluid. Further, each fluid tank is configured to hold a group of computing devices over the plurality of apertures. The system also includes an air-cooled heat exchanger. A pump is configured to circulate the dielectric fluid through the plurality of fluid tanks and the air-cooled heat exchanger. The air-cooled heat exchanger is disposed outside the building footprint and elevated at least fifteen feet over a support surface. The air-cooled heat exchanger is in fluid communication with the plurality of fluid tanks and is configured to receive the dielectric fluid. A fan is disposed outside the building footprint and is configured to circulate air through the air-cooled heat exchanger so as to remove thermal energy from the dielectric fluid. Beneficially, placing the air-cooled heat exchanger and fan outside the building footprint and elevating the may reduce the likelihood of recirculating cooling air through the heat exchanger by directing the used cooling air above the building.

II. Example Fluid Circulation Systems

Figure 1:
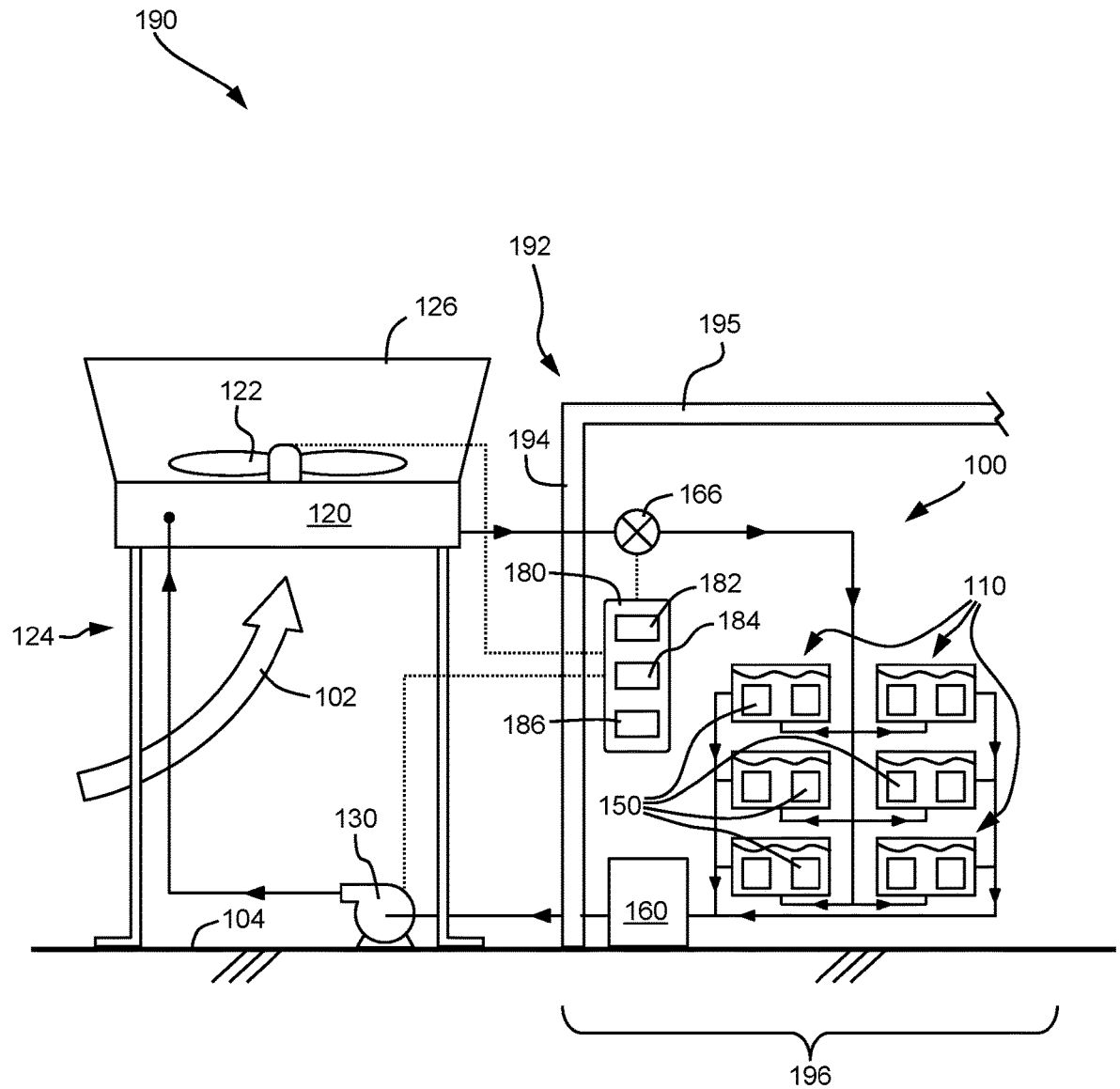
FIG. 1 is a schematic side view of a cooling facility including a fluid circulation system, according to an example embodiment.

FIG. 1 is a schematic depiction of a fluid circulation system 100, according to an example embodiment. The fluid circulation system 100 includes a plurality of fluid tanks 110, an air-cooled heat exchanger 120, and a pump 130 fluidly connected in a fluid circuit. In the fluid circulation system 100, a dielectric fluid may flow through at least the fluid tanks 110, the air-cooled heat exchanger 120, and the pump 130. Fluid paths in this example are as indicated in FIG. 1 and the flow direction of a fluid in a given fluid path is indicated by one or more arrows. FIG. 1 is illustrative only and other components (e.g., piping, valves, seals, sensors), and/or fluid paths may be included in embodiments of a fluid circulation system.

The fluid tanks 110 are configured to hold a plurality of computing devices 150. Fluid circulation system 100 may be configured to circulate dielectric fluid through the fluid tanks 110 in order to receive thermal energy from the plurality of computing devices 150. By receiving thermal energy from the plurality of computing devices 150, the dielectric fluid may cool the plurality of computing devices 150.

From the fluid tanks 110, the dielectric fluid may be circulated to the air-cooled heat exchanger 120, which is configured to receive the dielectric fluid and remove thermal energy from the dielectric fluid. A fan 122 may be positioned adjacent to the air-cooled heat exchanger 120 and configured to circulate cooling air 102 through the air-cooled heat exchanger 120. As this cooling air 102 passes through the air-cooled heat exchanger 120 it may receive thermal energy from the dielectric fluid that is circulating through the fluid circulation system 100. The removal of thermal energy from the dielectric fluid may be demonstrated by a reduction in temperature or condensing of the dielectric fluid. The lower energy dielectric fluid may then be circulated back to the fluid tanks 110 to remove additional thermal energy from the computing devices.

The pump 130 of the fluid circulation system 100 may be used to circulate the dielectric fluid through at least the fluid tanks 110 and air-cooled heat exchanger 120. In some embodiments, for example as shown in FIG. 1, the pump 130 may be coupled downstream of the fluid tanks 110 and upstream of the air-cooled heat exchanger 120. However, in other embodiments, the pump 130 may be arranged in different positions in the fluid circulation system 100, including downstream of the air-cooled heat exchanger 120 and upstream of the fluid tanks 110. The pump 130 may be formed by any actuator or mechanism that moves dielectric fluid, such as a rotary, piston, or other pump. In some embodiments, the pump 130 may operate to move dielectric fluid through the fluid circulation system 100 at a constant speed. In other embodiments, the pump 130 may operate at varying speeds as needed.

The air-cooled heat exchanger 120 may be elevated above a support surface 104, such as the ground, a foundation, or a support slab. For example, the air-cooled heat exchanger 120 may be held by a support structure 124 at a raised elevation of at least 15 feet, such as at least 18 feet, or at least 20 feet above the underlying support surface 104. In other words, the support structure 124 may extend between the support surface 104 and the air-cooled heat exchanger 120 so as to separate the air-cooled heat exchanger 120 and support surface 104 by the elevated distance. In other embodiments, the air-cooled heat exchanger may be positioned at a lower elevation, such as at least 6 feet above the support surface, at least 8 feet above the support surface, at least 10 feet above the support surface, or at least 12 feet above the support surface.

In some embodiments, the air-cooled heat exchanger may be held by a support structure at a raised elevation of at least about 20 feet, at a raised elevation of at least about 18 feet, at a raised elevation of at least about 15 feet, at a raised elevation of at least about 12 feet, at a raised elevation of at least about 10 feet, at a raised elevation of at least about 8 feet, and at a raised elevation of at least about 6 feet.

In some embodiments, the elevation of the air-cooled heat exchanger 120 may be elevated to the extent that it is positioned above other components of the fluid circulation system 100. For example, the air-cooled heat exchanger 120 may be elevated so as to be positioned higher than all of the fluid tanks 110 in the fluid circulation system 100. Moreover, as explained in further detail below, some of the fluid tanks 110 may likewise be elevated. Accordingly, the positioning of the air-cooled heat exchanger 120 above all the fluid tanks 110 results in a substantial elevation of the air-cooled heat exchanger 120 above the support surface 104.

Providing the air-cooled heat exchanger 120 at an elevated position may increase the heat transfer capability of the air-cooled heat exchanger 120. For example, the fan 122 associated with the air-cooled heat exchanger 120 may be configured to move cooling air 102 upward through the air-cooled heat exchanger 120 so as to send the warmed air upward and away from the air-cooled heat exchanger 120. By elevating the air-cooled heat exchanger 120, a larger area path is provided underneath the air-cooled heat exchanger 120 for drawing in cooling air. As a result, air that has passed through air-cooled heat exchanger 120 is less likely to be recirculated under the air-cooled heat exchanger 120, because the air-cooled heat exchanger has access to a larger volume of air to supply the cooling air 102.

In some embodiments, the fan 122 may be positioned above the air-cooled heat exchanger 120 and configured to draw cooling air 102 through the air-cooled heat exchanger 120. This position may allow the fan to project the warmed air upward to a greater extent and away from air-cooled heat exchanger 120. Moreover, the fan 122 may be surrounded by a shroud 126 that helps reduce the likelihood of the warmed air from recirculating to the inlet of the air-cooled heat exchanger. Alternatively, in some embodiments, the fan 122 may be positioned below the air-cooled heat exchanger 120 and blow the cooling air 102 through the air-cooled heat exchanger 120. The fan 122 may be formed by any device configured to move a gas, such as a rotating mechanisms that include blades or vanes.

In some embodiments, the fluid circulation system 100 may also include a collector 160 configured to receive the dielectric fluid leaving fluid tanks 110. The collector 160 may be configured restore the dielectric fluid so as to improve the heat transfer performance of the fluid circulation system 100. The collector 160 may be coupled downstream of the fluid tanks 110 and upstream of the pump 130, as shown in FIG. 1. However, in other embodiments, the collector 160 may be arranged in different positions in the fluid circulation system 100, including downstream of the pump 130, or downstream of the air-cooled heat exchanger 120 and upstream of the fluid tanks 110.

The fluid circulation system 100 may also include a filtering system configured to filter the circulating dielectric fluid. For example, the filtering system may be fluidly connected to the collector 160 and receive dielectric fluid from the collector 160. Such a filtering system may include an auxiliary pump and a filter that removes contaminants from the dielectric fluid. After the dielectric fluid passes through the auxiliary pump and filter of the filtering system, it may be returned to the collector 160, for example. Alternatively, in other embodiments, the filtering system may be coupled to another portion of the fluid circulation system.

Further, in some embodiments, the fluid circulation system 100 may include a safety valve 166 positioned downstream of the air-cooled heat exchanger 120 and upstream of the plurality of fluid tanks 110. Beneficially, such a safety valve 166 may be closed to prevent overflow of the fluid-containing components of the system, such as the fluid tanks 110 or collector 160. Once the safety valve 166 is closed, dielectric fluid located in the elevated air-cooled heat exchanger, which may be a substantial amount of dielectric fluid, can be prevented from flowing down under the force of gravity to unsealed components of the fluid circulation system, such as open-air tanks or chambers.

In some embodiments, the safety valve 166 is located at the elevated height of the air-cooled heat exchanger 120 so as to prevent the dielectric fluid from flowing down to lower sections of the fluid circulation system 100. In other embodiments, the safety valve 166 may be positioned at a lower elevation, where it may be more easily accessible by maintenance personnel. While the schematic illustration in FIG. 1 shows a single safety valve 166, in other embodiments, the safety valve may be one of a plurality of safety valves in the fluid circulation system. For example, in some embodiments, the fluid circulation system may include safety valves on both the downstream and upstream side of the air-cooled heat exchanger 120 to prevent the dielectric fluid from draining out of the air-cooled heat exchanger 120 in either direction. Further still, in some embodiments, the fluid circulation system 100 may include redundant safety valves 166 to prevent draining of the dielectric fluid if one of the valves fails.

In some embodiments, the safety valve is configured to close in response to a shut-off signal associated with a flow of dielectric fluid through the pump 130. For example, in some embodiments, if the fluid volume being circulated by the pump 130 falls below a predetermined quantity, an error may be recognized. With the error recognized, the pump 130 may be shut down and a shut-off signal may be sent to the safety valve 166 to close, so that dielectric fluid is held in the air-cooled heat exchanger 120 and prevented from draining.

In some embodiments, the fluid circulation system may include a controller configured to carry out methods associated with the fluid circulation system. For example, the controller may be configured to send control signals to various components of the fluid circulation system so as to control the flow of dielectric fluid through the system, such as the above-described shut-off. Likewise, the controller may receive information from sensors or other electronics that may be used to influence the control of such components. Moreover, the controller may be configured to carry out methods of the disclosure as explained further below. As an example, the fluid circulation system 100, shown schematically in FIG. 1, includes a controller 180 that is configured to send control signals to the pump 130, the fan 122, and the safety valve 166 in order to circulate dielectric fluid through the fluid circulation system 100 and cooling air 102 through the air-cooled heat exchanger 120.

The controller 180 may include a non-transitory computer-readable medium with program instructions stored thereon for performing various methods, including described methods of the disclosure. In some embodiments, the controller 180 may include at least one memory 182, at least one processor 184, and/or a network interface 186. In various embodiments, the controller may be formed as a general purpose computing device (e.g., a single core microprocessor or a multicore microprocessor) that is programmed to carry out methods of the disclosure, an application specific integrated circuit (ASIC) that performs processor operations, or a field-programmable gate array (FPGA).

The memory 182 may be a computer-usable memory, such as random access memory (RAM), read-only memory (ROM), a programmable read-only memory (PROM), an erasable programmable read-only memory (EPROM), an electrically erasable programmable read-only memory (EEPROM), non-volatile memory such as flash memory, a solid state drive, a hard-disk drive, an optical memory device, and/or a magnetic storage device.

The processor 184 may include computer processing elements, e.g., a central processing unit (CPU), a digital signal processor (DSP), graphics processor, or a network processor. In some embodiments, the processor 184 may include memory for temporarily storing instructions. Moreover, in some embodiments, the memory 182 may store program instructions that are executable by the processor 184 for carrying out the methods and operations of the disclosure.

The network interface 186 may provide a communications medium, such as, but not limited to, a digital and/or an analog communication medium between the controller 180 and other devices or systems. In various some embodiments, the network interface may operate via a wired connection or wireless connection, such as IEEE 802.11 or BLUETOOTH. Still in other embodiments, the network interface 186 may communicate using another convention.

While the controller 180 shown in FIG. 1 is illustrated as a single physical component that is in communication with each of the pump 130, fan 122, and safety valve 166, in some embodiments, the controller 180 may be formed by separate physical components that are in communication with one another, such as separate circuits associated with one or more components of the fluid circulation system 100. Furthermore, while the controller 180 of FIG. 1 is shown in the vicinity of the fluid-containing components of the fluid circulation system 100, in some embodiments, parts of the controller 180 may be remote from the fluid-containing components of fluid circulation system 100. For example, in some embodiments, one or more parts of the controller 180 may be remote from the fluid-containing components of the fluid circulation system 100 and communicate with components of the system via the network interface 186. Further, in some embodiments, the controller 180 may be formed entirely by a client device, i.e., a device actively operated by a user, while in other embodiments, the controller 180 may include a server device, e.g., a device that provides computational services to a client device. Moreover, other types of computational platforms are also possible in embodiments of the disclosure.

In some embodiments, the controller 180 may receive data from various sources, such as sensors that monitor aspects of the fluid circulation system and/or performance information related to the computing devices. Based on the received, data, the controller 180 may adapt the control signals sent to the pump 130, safety valve 166 or other components of the fluid circulation system. For example, the controller 180 may receive pressure and/or temperature values from portions of the fluid circulation system 100. Likewise, the controller 180 may receive fluid level information related to the height of dielectric fluid in the tanks or other components of the fluid circulation system 100. Further still, the controller 180 may receive information from the pump 130 so as to evaluate and control the operation of the pump 130 and other components of the fluid circulation system 100 based on pump operation. For example, the controller 180 may receive data indicating that the pump 130 is not operating correctly and, in response to this data, send a shut-off signal to close the safety valve 166.

While the schematic illustration in FIG. 1 of fluid circulation system 100 shows a single air-cooled heat exchanger 120 with one fan 122 and a single pump 130, in various embodiments the fluid circulation system 100 may include one or more of any of the air-cooled heat exchanger, fan and/or pump. For example, on some embodiments, the air-cooled heat exchanger may be one of a plurality of air-cooled heat exchangers that remove thermal energy from the circulated dielectric fluid. Likewise, in some embodiments the fan may be one of multiple fans. Such fans may be arranged to respectively direct air through separate heat exchangers or may be grouped to collectively direct air through larger heat exchangers.

Likewise, in some embodiments, the pump may be one of multiple pumps that are configured to circulate the dielectric fluid through the system. For example, in some embodiments, the fluid circulation system may include multiple pumps that are arranged in parallel. For instance, the pumps may be arranged to operate with respective groups of fluid tanks, or with respect heat exchangers. Further still, the pumps may be arranged in series. For example, in some embodiments, pumps may be positioned at multiple locations around the circulation system, such as upstream and downstream of the fluid tanks. Furthers still, while the fluid circulation system 100 shown in FIG. 1 is configured to return the dielectric fluid to the same pump 130 after it passes through the air-cooled heat exchanger 120 and fluid tanks 110, in other embodiments, the circulation system may include more complex series of components, with the dielectric fluid passing through more than one heat exchanger, fluid tank, and/or pump before completing a cycle through the fluid circulation system 100.

Figure 2:
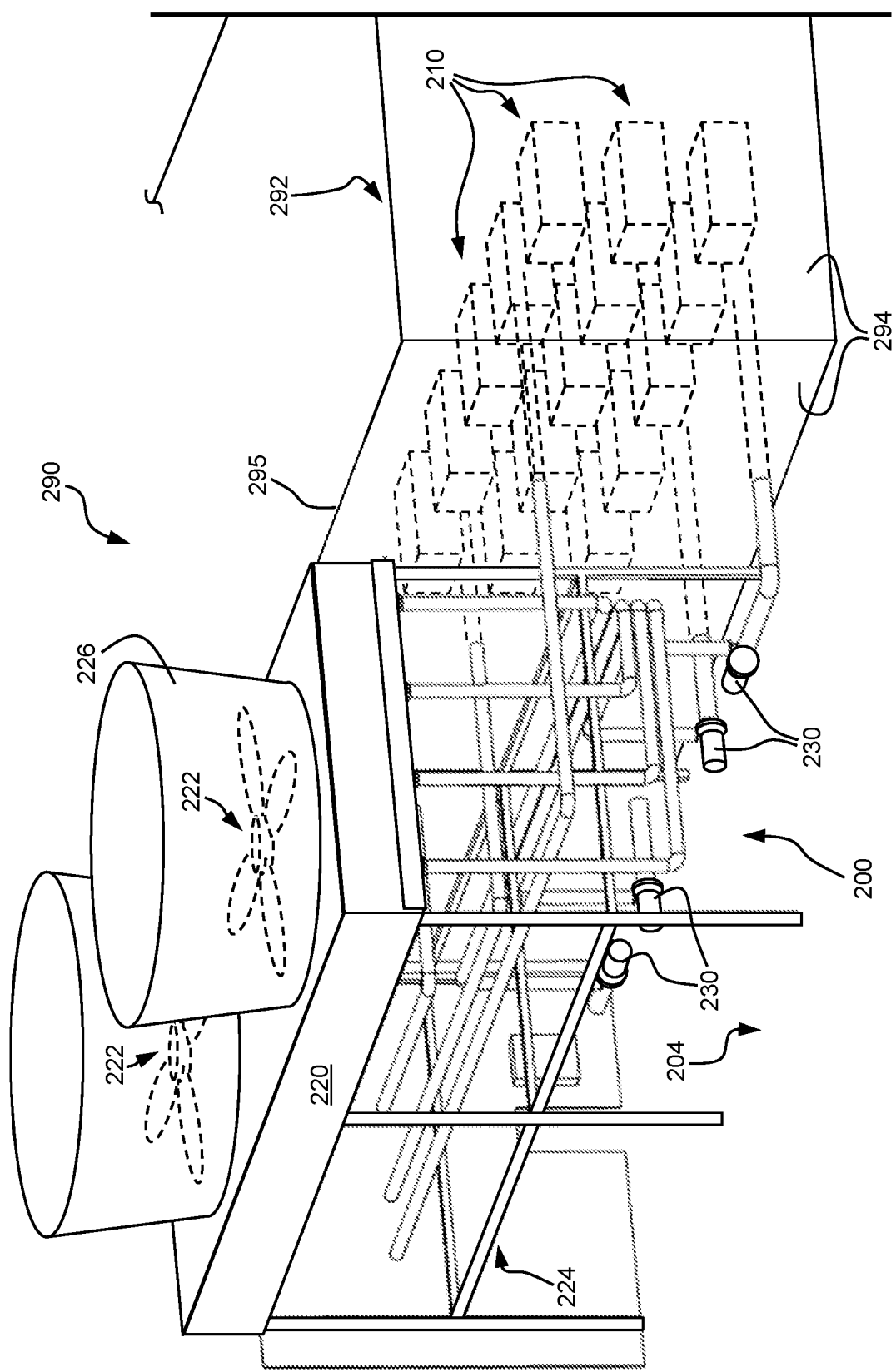
FIG. 2 is a schematic perspective view of a cooling facility including a fluid circulation system, according to another example embodiment.

FIG. 2 illustrates a schematic perspective view of an example fluid circulation system 200 that includes multiple pumps and fans. The fluid circulation system 200 includes an air-cooled heat exchanger 220, a plurality of fluid tanks 210 and four pumps 230 that circulate dielectric fluid through the air-cooled heat exchanger 220 and fluid tanks 210. The fluid circulation system 200 is organized such that the dielectric fluid exiting the air-cooled heat exchanger 220 flows through four paths to different groups of the fluid tanks 210. From each group of fluid tanks 210, the dielectric fluid flows to a respective one of the pumps 230 which recirculates the dielectric fluid back to the air-cooled heat exchanger 220. FIG. 2 does not illustrate any collectors or safety valves, as shown in FIG. 1. However one or more of each of these components may also be included in a fluid circulation system with the configuration of fluid circulation system 200 shown in FIG. 2.

As in the example of FIG. 1, the fluid tanks 210 of the fluid circulation system 200 are configured to hold computing devices so that dielectric fluid circulated through the fluid tanks 210 can cool the computing devices. As explained in more detail below, the fluid tanks 210 depicted in FIG. 2 are housed inside a building 292 and are behind a wall of 294 of the building. Accordingly, these fluid tanks 210 are schematically depicted using dashed lines.

After passing through the fluid tanks 210, the dielectric fluid may be driven by the pumps 230 up to the air-cooled heat exchanger 220, which is held by a support structure 224 over a support surface 204. In the illustrated embodiment, the air-cooled heat exchanger 220 is elevated above all of the fluid tanks 210 in fluid circulation system 200. Two fans 222 are used to draw cooling air through the air-cooled heat exchanger 220 so as to remove thermal energy from the dielectric fluid circulating through the fluid circulation system 200.

Although FIG. 2 has been described above with respect to four pumps 230, four paths, and two fans 222, in some embodiments, an example fluid circulation system may include more than four pumps, more than four paths, and/or more than two fans.

Figure 3:
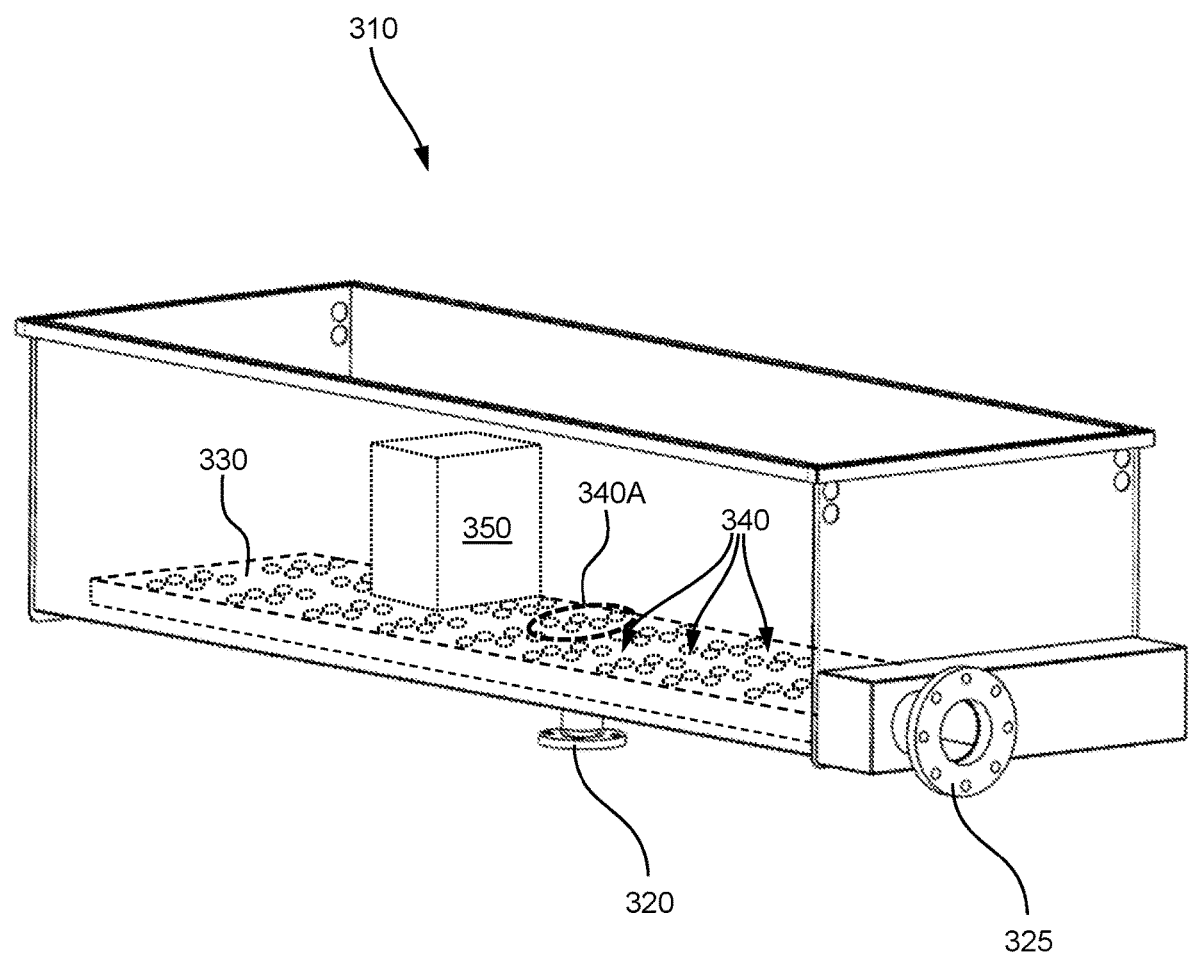
FIG. 3 is a perspective top view of a fluid tank, according to an example embodiment.

FIG. 3 is a perspective view of a fluid tank 310, according to an example embodiment. The fluid tanks described herein, such as those in the example fluid circulation system 100 and example fluid circulation system 200 may take the form of the fluid tank 310. The fluid tank 310 includes an inlet 320, an outlet 325, and a bottom 330. In some embodiments of the fluid circulation system, the inlet 320 is coupled downstream of the air-cooled heat exchanger, and the outlet 325 is coupled upstream of the pumps and/or collector. However, in other embodiments, the inlet 320 and outlet 325 may be coupled to other components in a fluid circulation system. In FIG. 3, a sidewall of the fluid tank 310 is removed for illustration.

The bottom 330 of the fluid tank 310 includes a plurality of apertures 340. The fluid tank 310 is configured to hold a plurality of computing devices. Groups of apertures of the plurality of apertures 340 may be associated with a particular computing device of the plurality of computing devices. In FIG. 3, a first computing device 350 of the plurality of computing devices is disposed over a first group of apertures of the plurality of apertures 340. A second group apertures 340A is shown in FIG. 3. The term computing device, as used herein, includes devices configured to execute software, including servers and desktop computers. Computing devices may include one or more processors, memory, and input/output connections.

In an embodiment of the fluid circulation system of the disclosure, a dielectric fluid may flow through the inlet 320 through the plurality of apertures 340 upward past the first computing device 350 and the other computing devices of the plurality of computing devices so as to receive thermal energy from the first computing device 350 and the other computer devices of the plurality of computing devices. The dielectric fluid, having received thermal energy from the plurality of computing devices, then flows through outlet 325.

The fluid tank 310 may be an open tank that is unsealed. The term "open tank," as used herein, refers to a tank where the dielectric fluid has an upper surface that is in fluid communication with a gas, such as the ambient environment. Accordingly, gravity may hold the fluid in the tank rather than a fully enclosed structure. It should be understood that the term open tank does not preclude the use of a cover over the tank to prevent dust or other debris from falling in the tank.

In some embodiments, the plurality of computing devices may be submerged in the dielectric fluid. For example, in some embodiments, the plurality of computing devices may be fully submerged in the fluid tank 310. In other embodiments, at least one computing device of the plurality of computing devices, such as the first computing device 350, may be partially submerged in dielectric fluid. For example, the first computing device 350 may be partially submerged within the fluid tank 310.

In some embodiments, the plurality of apertures 340 in each fluid tank 310 may include between 5 to 10, 10 to 15, 15 to 20, 20 to 25, 25 to 30, or 30 to 35 groups of apertures. Other numbers of groups of apertures of the plurality of apertures are possible as well.

In some embodiments, the number of computing devices held in each fluid tank 310 may include between 5 to 10, 10 to 15, 15 to 20, 20 to 25, 25 to 30, and 30 to 35 computing devices. Other numbers of computing devices in the plurality of computing devices are possible as well.

Figure 4:
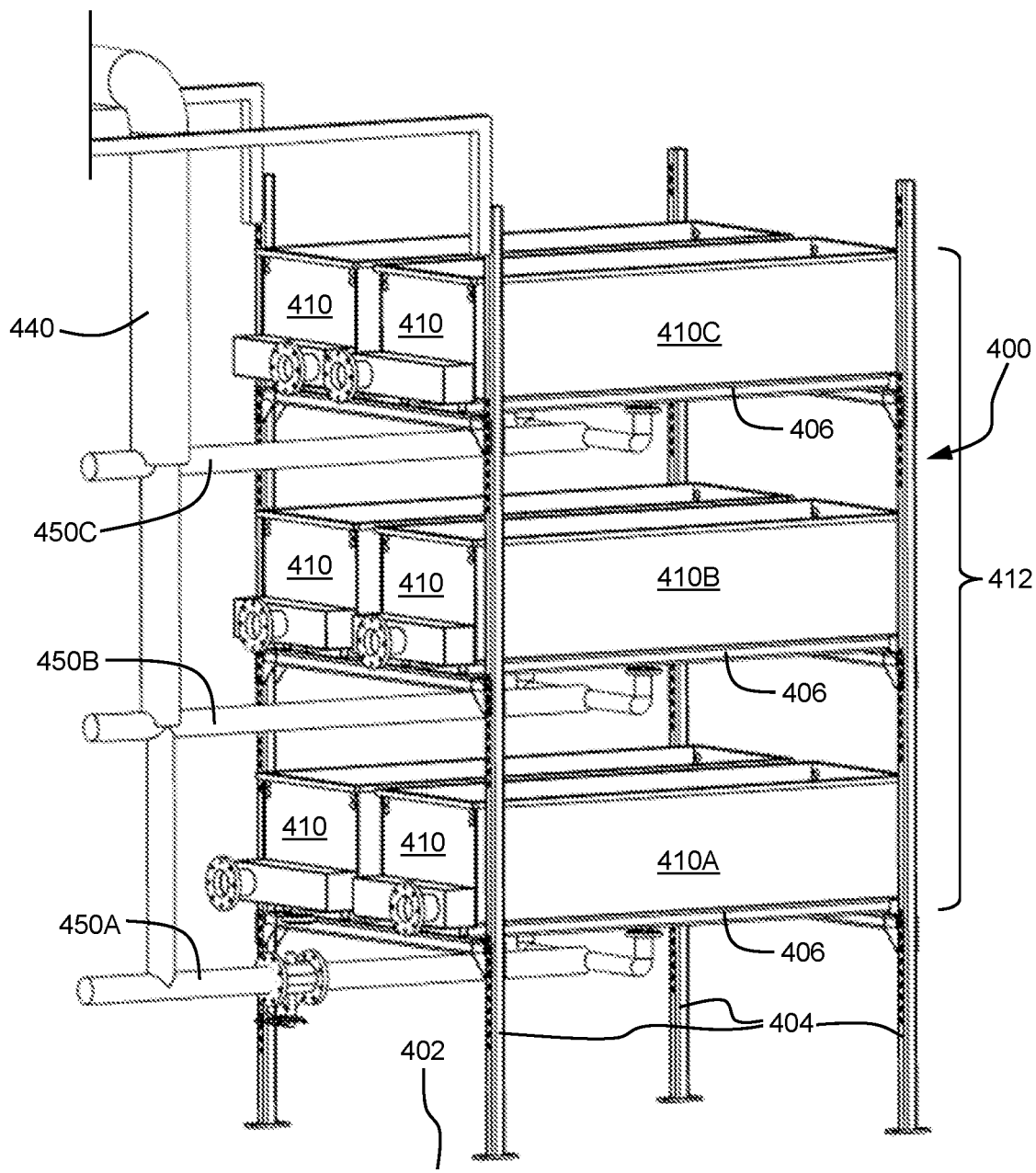
FIG. 4 is a perspective view of a group of fluid tanks, according to an example embodiment.

In some embodiments of the fluid circulation system, the fluid tanks are arranged in a stacked configuration. For example, FIG. 4 shows a perspective view of a frame 400 that holds a group of fluid tanks 410 in columns, with some of the fluid tanks arranged above other fluid tanks in the group. For instance, the frame 400 may include vertical legs 404 that extend upward from a floor surface 402. At various heights, the frame include cross struts 406 that support the fluid tanks 410. In the illustrated embodiment, the frame 400 supports two columns each having three fluid tanks. For example, the frame 400 shown in FIG. 4 includes a first column 412 arranged in three levels that respectively include a first fluid tank 410A, a second fluid tank 410B and a third fluid tank 410C. The three fluid tanks 410A-410C are vertically arranged with second fluid tank 410B positioned over first fluid tank 410A, and third fluid tank 410C positioned over second fluid tank 410B. With this arrangement, the three fluid tanks 410A-410C may use space efficiently by reducing the footprint of space that is needed for each fluid tank.

To provide dielectric fluid to the fluid tanks 410 that are held frame 400, a fluid supply pipe 440 directs dielectric fluid to feed pipes 450A-450C that are arranged at each level in the column. Accordingly, the first fluid tank 410A of the first column 412 may receive dielectric fluid from the first feed pipe 450A, the second fluid tank 410B may receive dielectric fluid from the second feed pipe 450B and the third fluid tank 410C may receive dielectric fluid from the third feed pipe 450C.

While the illustrated embodiments show the fluid tanks of the fluid circulation systems stacked in columns, in some embodiments all of the tanks may be provided at the same height. It should be understood that the term "fluid tank," as described herein, may be characterized by a delimited fluid containing space that is configured to hold computing devices. Thus, a single structure with multiple chambers that each hold computing devices may be construed as a structure that includes multiple fluid tanks.

Figure 5:
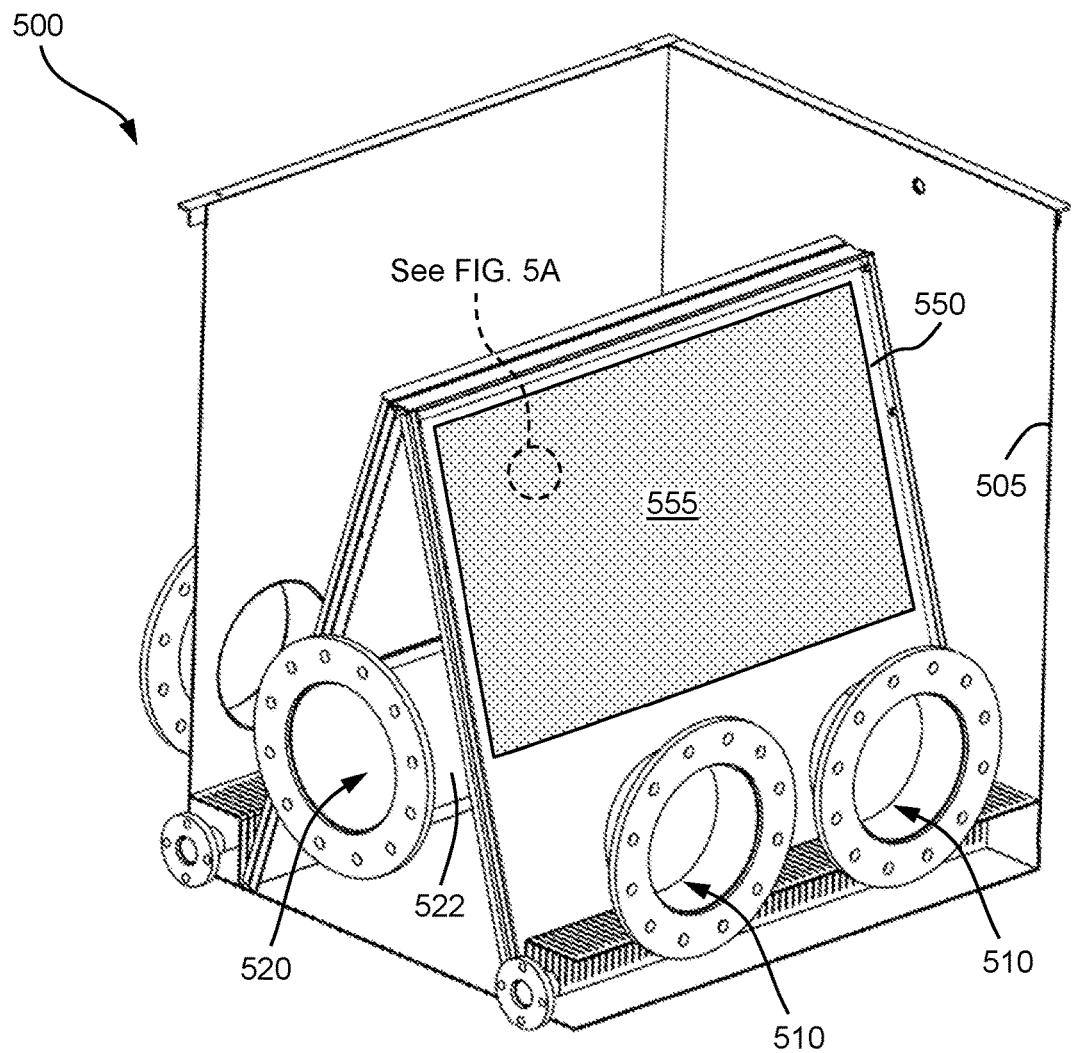
FIG. 5 is a perspective view of portions of a collector, according to an example embodiment.

FIG. 5 is a perspective view of a collector 500, according to an example embodiment. The collectors described herein may take the form of the collector 500. The collector 500 may include a housing 505 formed by several walls. In the depiction shown in FIG. 5 two of the sidewalls and the top wall have been removed to illustrate internal components of the collector 500. The collector 500 may also include one or more collector inlets 510 and one or more collector outlets 520. Within an example fluid circulation system, the collector 500 may be positioned downstream of the fluid tanks and upstream of the pump(s). For example, the collector inlet 510 may be in fluid communication with the fluid tanks so as to receive heated dielectric fluid that has passed through the tanks, and the collector outlet 520 may be in fluid communication with one or more pumps configured to move the fluid to a heat exchanger. Alternatively, in other embodiments, the inlet 510 and outlet 520 may be coupled to other components of the fluid circulation system.

Figure 6:
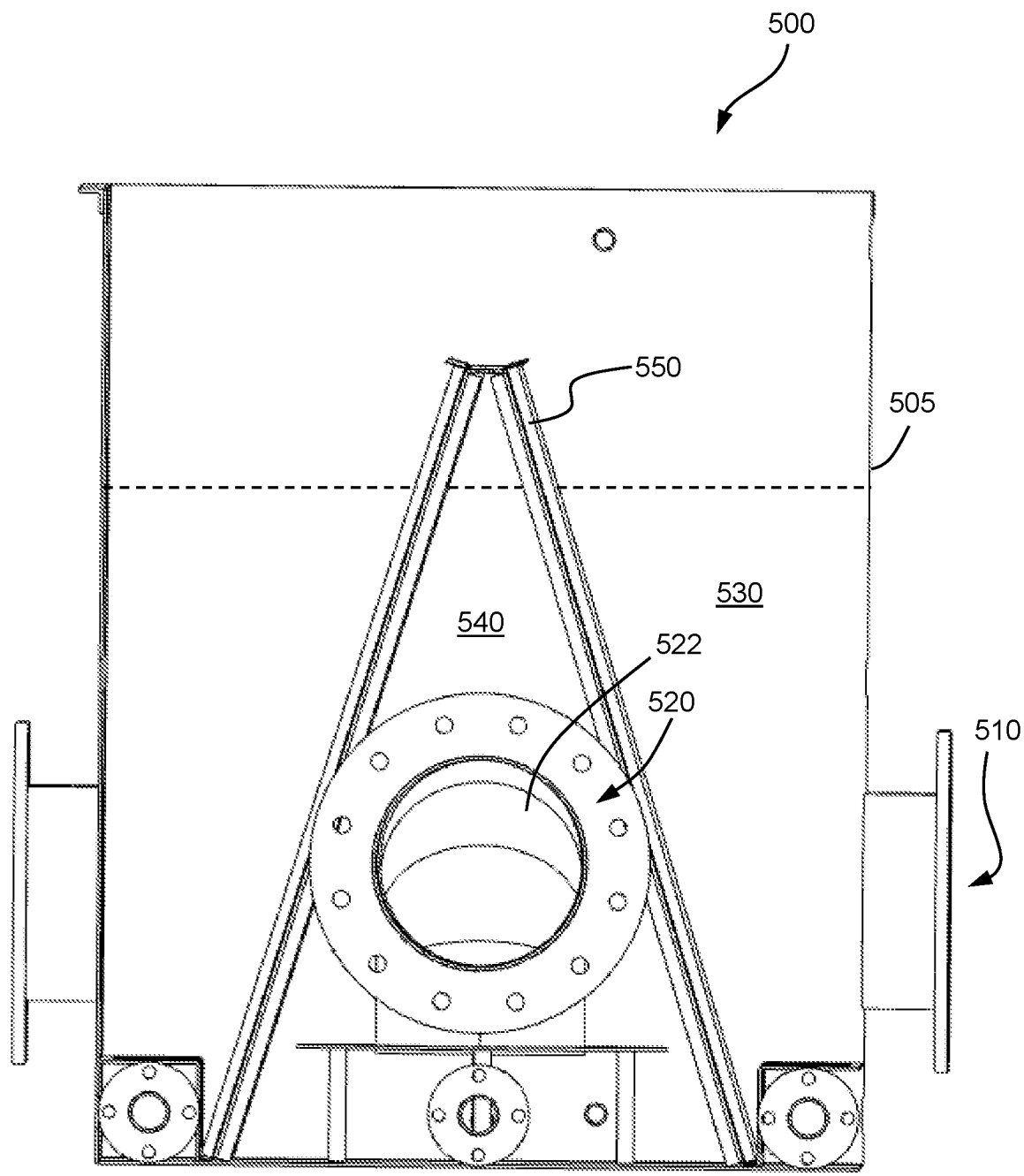
FIG. 6 is a side view of the collector of FIG. 5.

As shown in FIG. 6, the interior of the collector 500 may include a first cavity 530, a second cavity 540, and a plate 550 separating the first cavity 530 from the second cavity 540. The inlets 510 open into the first cavity 530 and are configured to supply dielectric fluid into the collector 500.

Figure 5A:
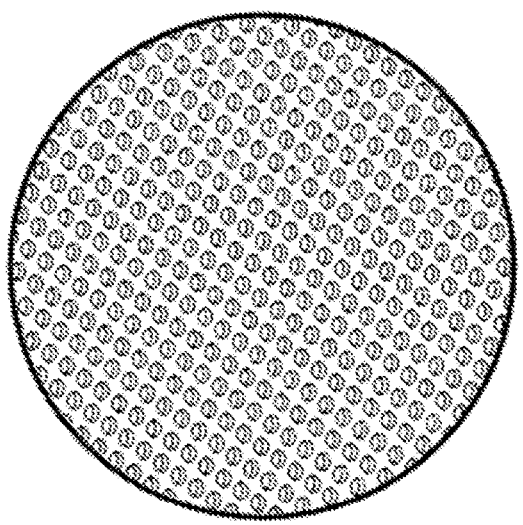
FIG. 5A is a detailed view of a portion of FIG. 5.

The plate 550 may be disposed at an angle such that a portion of the first cavity 530 is positioned above a portion of the second cavity 540. Further, the plate 550 may include a plurality of perforations 555, as shown in FIG. 5A, that provide fluid access for moving dielectric fluid from the first cavity 530 to the second cavity 540.

In some embodiments, a first fluid path through the collector 500 extends from the inlets 510, through the first cavity 530, through the plurality of perforations 555, through the second cavity 540, and to the outlet 520. The collector 500 may also include piping 522 configured to convey dielectric fluid from the second cavity 540 to the outlet 520. The piping 522 may be referred to as a downspout. In some embodiments, dielectric fluid flowing through the plurality of perforations 555 and into the second cavity 540 contacts an outer surface of the piping 522.

In the depicted embodiment, collector 500 has a symmetrical configuration with additional inlets provided on the opposite side of housing 505 that enter into another first cavity. Likewise, an opposing plate is angled over second cavity 540, such that second cavity 540 may receive dielectric fluid from multiple directions. In other embodiments, the collector may have another configuration, for example with only one plate.

Figure 7:
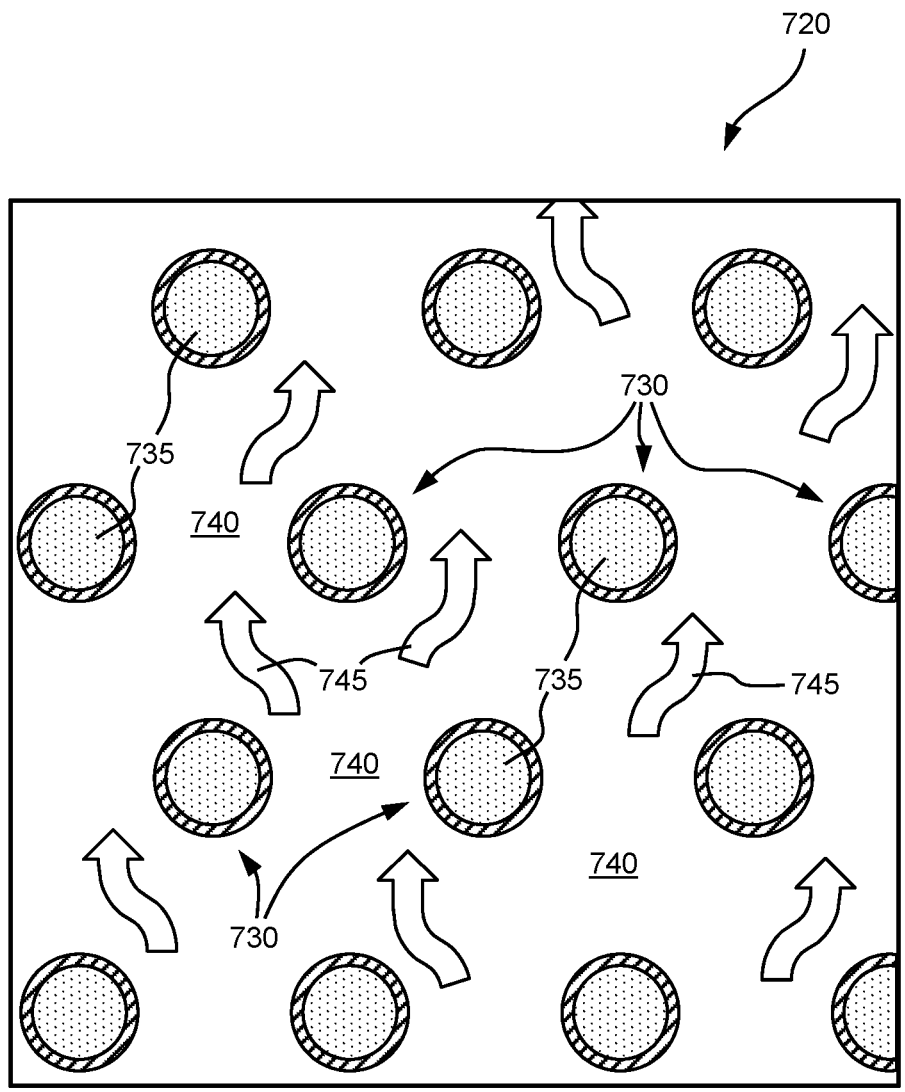
FIG. 7 is a cross-sectional side view of a portion of an air-cooled heat exchanger, according to an example embodiment.

FIG. 7 is a cross-sectional view of a portion of an air-cooled heat exchanger 720 according to an example embodiments. The air-cooled heat exchangers described herein, such as those in the example fluid circulation system 100 and example fluid circulation system 200 may include cross-sections such as those shown by air-cooled heat exchanger 720. The air-cooled heat exchanger 720 may include a plurality of enclosed conduits 730, such as pipes, that are configured to receive a dielectric fluid 735. Air passages 740 may be provided between the conduits 730 so that cooling air 745 can flow around the conduits 730 and absorb thermal energy from the dielectric fluid 735 in the conduits 730. In some embodiments, the external fins may be secured to the conduits to enhance heat transfer to the cooling air.

In accordance with the present disclosure, embodiments of the fluid circulation system may be supplied with a dielectric fluid having characteristics that allow the conduits to have small cross-sectional areas. For example, in some embodiments the enclosed conduits within the air-cooled heat exchanger may have a cross-sectional area of less than one sq inch. For example, the conduits may have a cross-sectional area less than 0.8 sq inch, or less than 0.5 sq inch, or less than 0.2 sq inch. For example, the conduits may have a diameter of ½ inch, which yields a cross-sectional area of slightly less than 0.2 sq inch. While the illustrated conduits 730 have circular cross-sections, in other embodiments, the conduits may have other shapes, such as oval, polygonal, or elongated gaps between plates.

In some embodiments, the fluid circulation system of the disclosure includes a dielectric fluid within the components of the system, such as the air-cooled heat exchanger, pump, and fluid tanks. However, aspects of the fluid circulation system described herein may also be used with other fluids. The term dielectric fluid, as used herein, includes various dielectric fluids that are known in the art and can suitably be used in the systems and methods described herein. For example, the dielectric fluids may be an oil-based dielectric, such as a hydrocarbon-based oil dielectric or silicone oil dielectric, and may have a dielectric strength above 40 kV at 2 mm.

In some embodiments, the dielectric fluid has a kinematic viscosity that allows it to be transported through small spaces, such as conduits within the air-cooled heat exchanger. For example, in some embodiments, the dielectric fluid has a kinematic viscosity at 45° C. of no more than 20 cSt, such as no more than 15 cSt, no more than 12 cSt or no more than 10 cSt.

III. Example Cooling Facilities

The above-described fluid circulation systems, or portions thereof, may be incorporated into a cooling facility configured to cool computing devices using a fluid. For example, fluid circulation system 100, as shown in FIG. 1, is incorporated into a cooling facility 190 that includes a building 192 that houses fluid tanks 110, a support surface 104 outside the building 192 and a support structure 124 that elevates the air-cooled heat exchanger 120 above support surface 104. In some embodiments, the cooling facility may extend across the entire building such the building is primarily used for cooling computing devices. Alternatively, in some embodiments, the fluid tanks of the cooling facility may occupy only a portion of the building, such as a single room, or a portion of a room, such that the building may also be used for other purposes. In other words, the term cooling facility is not limited to constructions where an entire building is dedicated to cooling computing devices.

The building 192 may include walls 194 and a roof 195 that define a building footprint 196. The term building footprint, as used herein, refers to a horizontal area that is occupied by the building and is independent of height. With respect to FIG. 1, the walls 194 define the boundaries of the building footprint 196 and the roof 195 extends over the building footprint 196. It should be understood that, while an area outside the building may include space above the building, an area outside the building footprint excludes the space directly above the building, such as on the roof.

As shown in FIG. 1, portions of fluid circulation system 100, such as pipes, may extend between the inside of the building 192 and the outside of the building 192. This allows the fluid circulation system 100 to move the dielectric fluid between the fluid tanks 110, which are inside the building 192 and the air-cooled heat exchanger 120, which outside the building footprint 196.

Further, in some embodiments, portions of the fluid circulation system that are located outside the building 192 may be sealed so as to prevent contaminants from the surrounding environment from polluting the dielectric fluid in the fluid circulation system 100. For example, the entire portion of the fluid circulation system 100 that is positioned outside the building may be isolated from the surrounding environment. Thus, in some embodiments, all of the portion of the fluid circulation system 100 that is outside the building may operate at a pressure that is above ambient pressure. In contrast, portions of the fluid circulation system 100 that are inside the building 192 may be open to the surrounding environment, such as in the open tanks 110. Accordingly, portions of the fluid circulation system 100 inside the building 192, such as at the fluid surface of the tanks 110, may operate at ambient pressure.

While the pump 130 of fluid circulation system 100 is shown outside the building 192 in FIG. 1, in other embodiments, the pump may be inside the building. Likewise, while the collector 160, safety valve 166 and controller 180 are shown inside the building 192, in other embodiments, these components may be outside the building 192.

As shown in FIG. 1, the shroud 126 surrounding the fan 122 may exhaust the air to an area that is above the roof 195 of the building 192. For example, the upper outlet of the shroud 126 may be positioned above the roof 195 so that the expelled air leaves the shroud 126 at a location that is already elevated above the roof 195. Alternatively, in some embodiments, the outlet of the shroud may be near the roof, such as within five feet of the roof, or with in two feet of the roof. Having the outlet of the shroud near the roof can also help direct the warmed air above the roof. Further still, in some embodiments the fan 122 or both the air-cooled heat exchanger 120 and the fan 122 may be positioned above the roof. Directing the warmed air from the air-cooled heat exchanger 120 over the roof can increase the likelihood that the air flows away from the air-cooled heat exchanger and reduce the likelihood that the air will recirculate into the air-cooled heat exchanger.

Fluid circulation system 200, as shown in FIG. 2, is similarly incorporated into a cooling facility 290 that includes a building 292 that houses the fluid tanks 210. Outside the building 292 the air-cooled heat exchanger 220 is supported above a support surface 204 by a support structure 224. The pumps 230 transfer the dielectric fluid from the tanks 210 within the building 292 to the elevated air-cooled heat exchanger 220 outside the building. The air-cooled heat exchanger 220 is positioned next to the roof 295 of building 292, such that the fans 222 and associated shrouds 226 are both above the roof 295.

Figure 8:
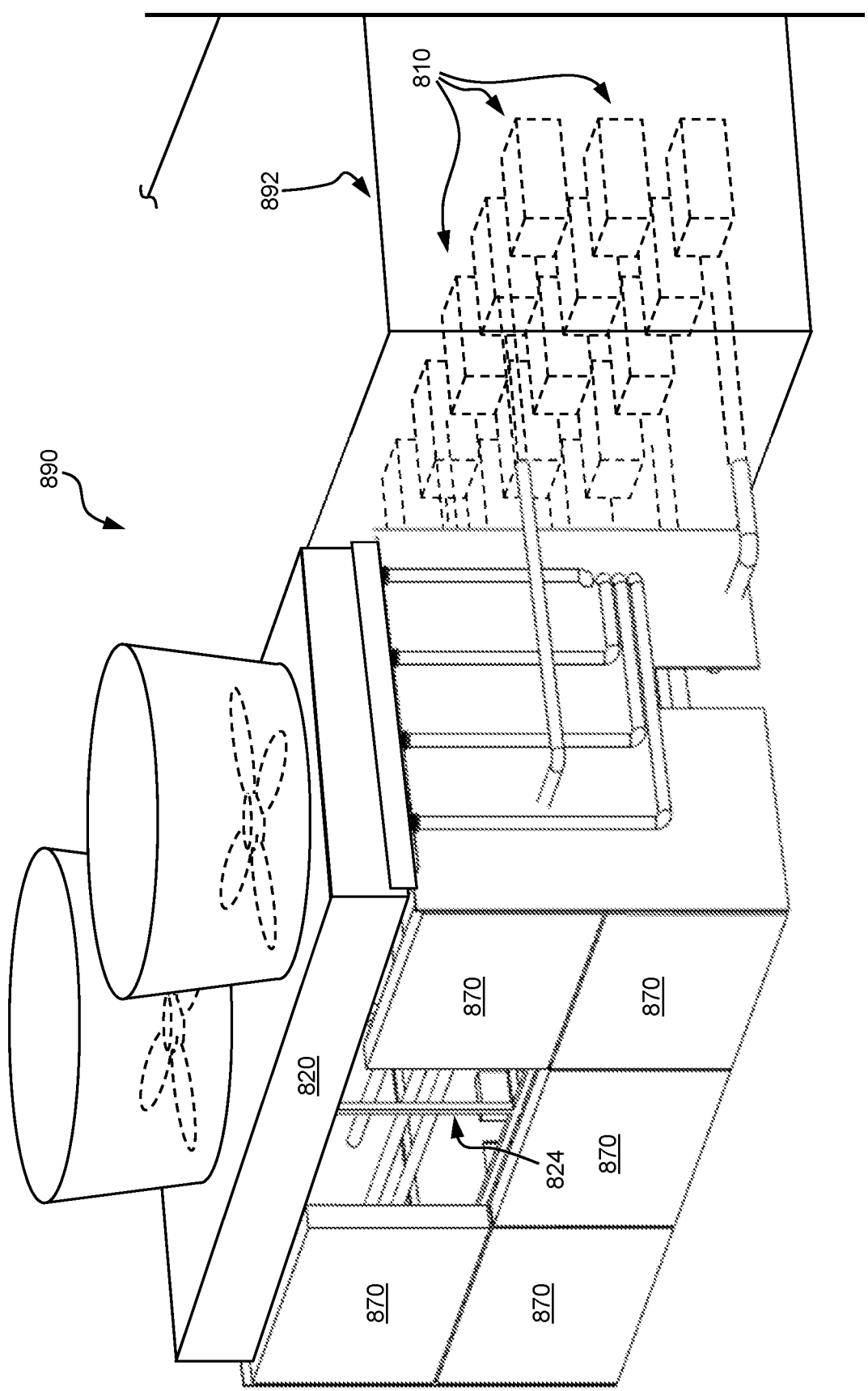
FIG. 8 is a schematic perspective view of a cooling facility including a fluid circulation system according to another example embodiment.

In some embodiments, the cooling facility may include a secondary heat exchanger positioned adjacent to the air-cooled heat exchanger and configured to cool air that enters the air-cooled heat exchanger. An example of such a cooling facility 890 is shown in FIG. 8. The cooling facility 890 includes a fluid circulation system with a plurality of fluid tanks 810 that are positioned inside a building 892 and an elevated air-cooled heat exchanger 820 positioned outside the building 892. The air-cooled heat exchanger 820 is held up by a support structure 824. Positioned at the edge of the support structure 824 is a plurality of secondary heat exchangers 870. The secondary heat exchangers 870 may include a cooling fluid circulating therethrough, such as water or a refrigerant, to reduce the temperature of the cooling air before it enters the air-cooled heat exchanger 820.

IV. Conclusion

Although the disclosure has been described above in connection with specific embodiments, features of one embodiment may be employed with other embodiments as the skilled artisan would recognize, even if not explicitly stated herein.

Examples given above are merely illustrative and are not meant to be an exhaustive list of all possible embodiments, applications, or modifications of the disclosure. Thus, various modifications and variations of the described apparatus, system, and methods will be apparent to those skilled in the art without departing from the scope and spirit of the disclosure.

The invention claimed is:

1. A fluid circulation system for cooling a plurality of computing devices with a dielectric fluid, the fluid circulation system comprising:
 a plurality of fluid tanks, each fluid tank comprising a bottom having a plurality of apertures for receiving the dielectric fluid, wherein each fluid tank is configured to hold a group of computing devices over the plurality of apertures;
 an air-cooled heat exchanger elevated at least fifteen feet over a support surface, wherein the air-cooled heat exchanger is in fluid communication with the plurality of fluid tanks and is configured to receive the dielectric fluid, and wherein the air-cooled heat exchanger comprises:
 enclosed conduits configured to receive the dielectric fluid, and
 air passages between the enclosed conduits;
 a fan configured to circulate air through the air-cooled heat exchanger so as to remove thermal energy from the dielectric fluid; and
 a pump configured to circulate the dielectric fluid through the fluid circulation system.

2. The fluid circulation system of claim 1, wherein the air-cooled heat exchanger is positioned higher than each of the plurality of fluid tanks.

3. The fluid circulation system of claim 2, wherein the plurality of fluid tanks includes a first fluid tank disposed over a second fluid tank in a column.

4. The fluid circulation system of claim 1, further comprising a safety valve downstream of the air-cooled heat exchanger and upstream of the plurality of fluid tanks.

5. The fluid circulation system of claim 4, wherein the safety valve is configured to close in response to a shut-off signal associated with a flow of the dielectric fluid through the pump.

6. The fluid circulation system of claim 1, wherein at least a portion of the enclosed conduits of the air-cooled heat exchanger have a cross-sectional area of no more than 1 sq inch.

7. The fluid circulation system of claim 1, wherein each fluid tank of the plurality of fluid tanks is an open tank.

8. The fluid circulation system of claim 1, further comprising a collector including a first cavity, a second cavity, and a perforated plate between the first and second cavities.

9. The fluid circulation system of claim 8, wherein the collector is downstream of the plurality of fluid tanks and upstream of the pump, and wherein the pump is upstream of the air-cooled heat exchanger.

10. The fluid circulation system of claim 1, further comprising the dielectric fluid disposed in the plurality of fluid tanks, the air-cooled heat exchanger, and the pump.

11. The fluid circulation system of claim 10, wherein the dielectric fluid has a kinematic viscosity at 45° C. of no more than 20 cSt.

12. A cooling facility comprising:
 a building comprising walls and a roof that defines a building footprint;
 a plurality of fluid tanks disposed inside the building, each fluid tank of the plurality of fluid tanks comprising a bottom having a plurality of apertures for receiving a dielectric fluid, wherein each fluid tank of the plurality of fluid tanks is an open tank and is configured to hold a group of computing devices over the plurality of apertures;

an air-cooled heat exchanger disposed outside the building footprint and elevated at least fifteen feet over a support surface, wherein the air-cooled heat exchanger is in fluid communication with the plurality of fluid tanks and is configured to receive the dielectric fluid;

a fan disposed outside the building footprint and configured to circulate air through the air-cooled heat exchanger so as to remove thermal energy from the dielectric fluid; and a pump configured to circulate the dielectric fluid through the plurality of fluid tanks and the air-cooled heat exchanger, wherein the plurality of fluid tanks, the air-cooled heat exchanger, and the pump are part of a fluid circulation system, wherein the fluid circulation system includes a portion that is inside the building and a portion that is outside the building, and wherein the portion of the fluid circulation system that is outside the building is sealed.

13. The cooling facility of claim 12, wherein the air-cooled heat exchanger is positioned higher than each of the plurality of fluid tanks.

14. The cooling facility of claim 12, wherein the fan is disposed above the air-cooled heat exchanger.

15. The cooling facility of claim 14, wherein the fan is surrounded by a shroud, and wherein an outlet of the shroud is positioned higher than the roof of the building.

16. The cooling facility of claim 12, wherein the plurality of fluid tanks includes a first fluid tank disposed over a second fluid tank in a column.

17. The cooling facility of claim 12, further comprising a secondary heat exchanger disposed adjacent to the air-cooled heat exchanger and configured to cool the air that enters the air-cooled heat exchanger.

\* \* \* \* \*